Nov. 19, 1968 W. J. SIEGEL 3,411,594
MAINTENANCE UNIT
Filed March 31, 1966
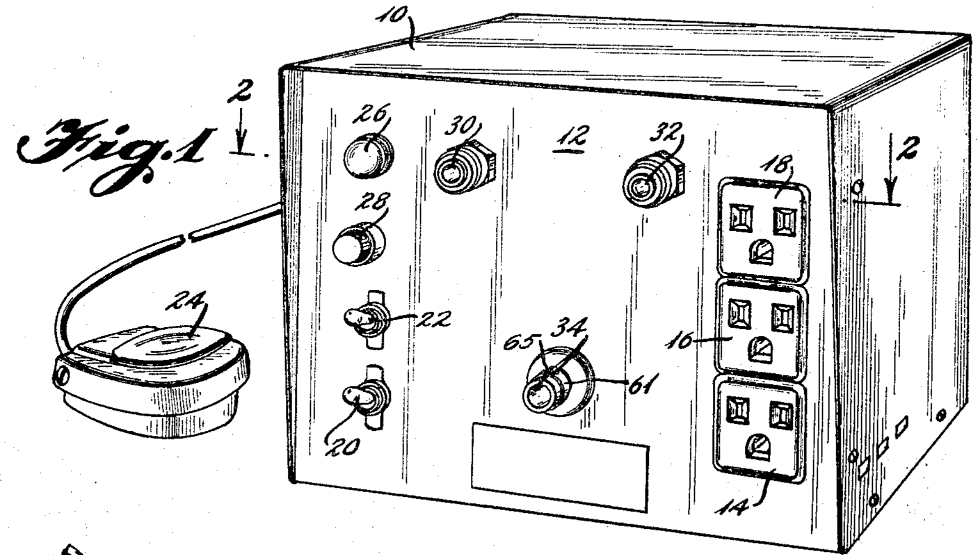
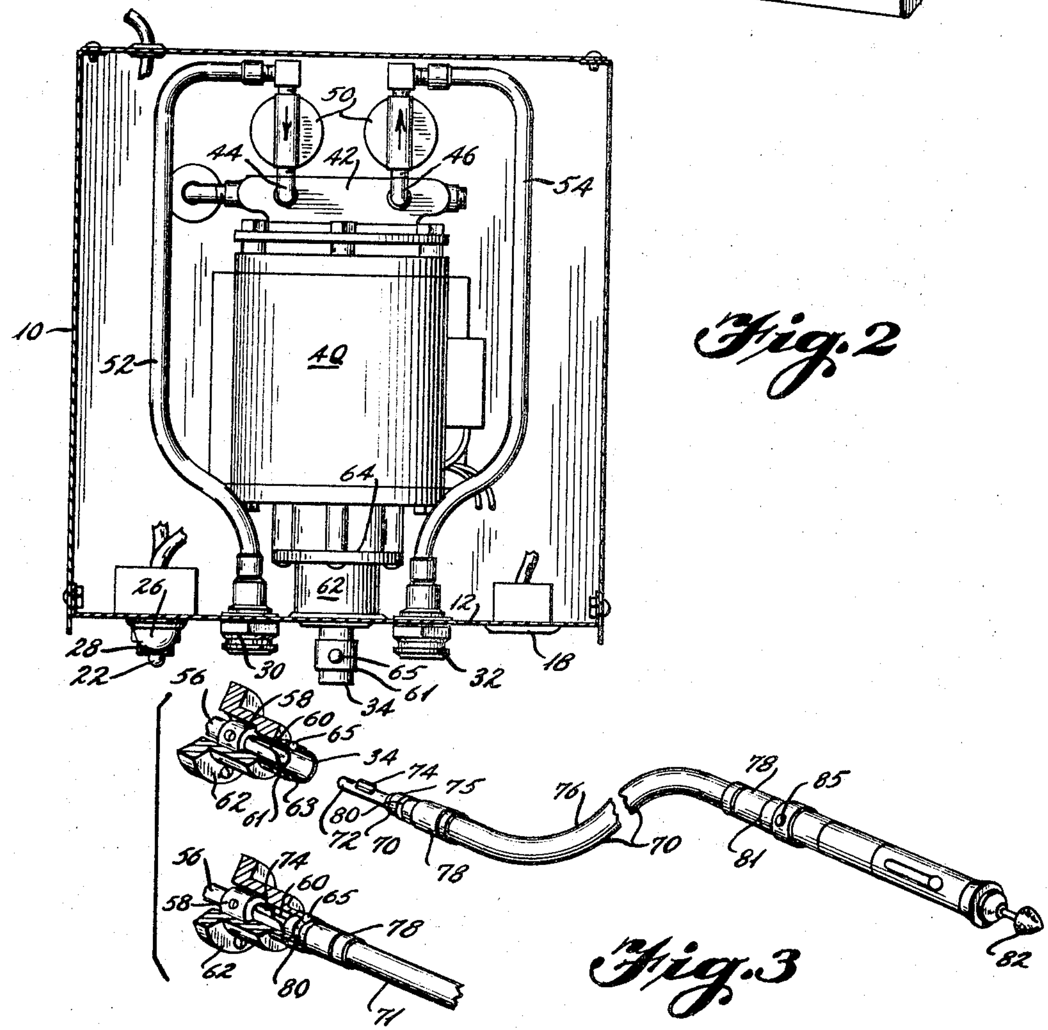

United States Patent Office 3,411,594
Patented Nov. 19, 1968

1

3,411,594
MAINTENANCE UNIT
William Jordan Siegel, 814 E. Franklin Ave.,
Silver Spring, Md. 20901
Filed Mar. 31, 1966, Ser. No. 539,168
7 Claims. (Cl. 173—170)

ABSTRACT OF THE DISCLOSURE

The invention is equipment adapted for use in electronic repair and consists of a unitary source of vacuum, pressure and mechanical drive, the source being an electric motor-blower combination. The unitary source is associated with a panel face, a pressure tap thereon connecting to the blower outlet, a suction tap thereon leading to the blower inlet, and a mechanical drive outlet thereon connecting to the motor drive shaft.

This invention relates to a combination unit particularly adapted for the repair and reconstruction of electronic circuits and assemblies.

The tendency more and more towards micro miniturization in electronic gear, i.e. printed circuit boards replace hand wired circuits, integrated circuits replace circuit boards, along with encapsulation of the entire circuit and high density packaging have added to the immeasurable difficulties of repair and maintenance of the electronic gear. The problems of repair and maintenance are further compounded by the broad variety of equipment types in widespread use and the minimal degree of manufacturing uniformity by the vast number of suppliers of electronic gear.

Serious efforts on the part of suppliers to insure high product quality and products of a maintenance free character are accompanied often by virtual refusal to face the reality of equipment failure. Frequently the most complex and expensive piece of equipment must be shut down for failure of a single connection or of one inexpensive component. The truth of the matter is that maintenance and repair must be provided for; the repair technician must have tools comensurate with the complexity of modern electronic gear.

The object of the present invention is to provide a repair unit with which a technician may do close and accurate work on electronic components.

A further object of the invention is to provide integrally, suction, pressure and mechanical drive as the central features of a repair and maintenance power center.

Still further objects and the advantages of the present invention will be apparent from the description which follows.

Briefly stated the present invention provides for a virtually self-contained versatile electronic repair unit which a skilled mechanic can employ as the equipment basis for making repairs on even the most complex electrical circuitry. A single compact housing contains components which make available to the repair technician the electrical power, mechanical drive power, vacuum and pressure by quick connection coupling on a panel face. The present invention provides as part of the unit a facile association of elements into an entity from which the suction the pressure and the mechanical drive may be taken, simultaneously if so desired.

For further understanding of the invention, reference is now made to the attached drawing wherein:

FIG. 1 shows the housing and front panel of the repair and maintenance unit.

FIG. 2 illustrates a motor pump forming part of the

2 present invention and is taken along lines 2—2 of FIGURE 1.

FIG. 3 is a diagrammatic view showing the mechanical drive and its connection to the front end of the motor pump, shown assembled and disassembled.

Referring now to FIG. 1 of the drawing it may be seen that the maintenance power center or unit 10, is provided with a panel face 12 containing thereon electrical outlets 14, 16, 18 and on-off switch 20, a pedal switch 22, the foot operated pedal 24 being plugged into or attached to an electrical outlet (not shown) in the side or rear of center 10. Additionally present are a warning light 26 to show when center 10 is powered, and a rotatable knob 28 for a fuse to allow ready replacement thereof. Operation of the foregoing components are self-explanatory. Also since the electrical connections inside center 10 associated therewith are of the sort which would suggest themselves to the skilled in the art they will not, therefore, be described in detail. However, their presence is important to center 10 by themselves and in association with pressure tap 30, vacuum tap 32, and mechanical drive tap 34 which made up the balance of the service available on panel 12 of maintenance center 10. Other services e.g., of electric power can be provided with a larger unit.

As shown in FIG. 1, the fittings for pressure and vacuum taps 30, 32 are of a quick connect type so repair function accessories may be readily attached thereto as needed. As will be explained in more detail hereafter, the fitting structure of mechanical drive tap 34 is also adapted for quick connect and disconnect.

An important aspect of the present invention is that the pressure, vacuum and mechanical drive connections are all taken from the same power source in an uncomplicated fashion. All three have operational characteristics related closely to the overall repair and maintenance function of center 10. Referring now to FIGS. 2 and 3 of the drawing, it may be seen that a motor 40, preferably of a constant speed type directly drives a centrifugal pump or blower 42. The vacuum side 44 and the pressure side 46 of blower 42 pass through filter muffler 50 via lines 52, 54 to the pressure and vacuum taps respectively on the panel face 12. The drive shaft 56 of motor 40 is extended on the side opposite blower 42 past the motor housing so that it may be provided wih the female half of a quick connect structure of the nature illustrated (FIG. 3).

Directly mounted on the end of drive shaft 56 is a slot adapter 58, the slot being shown at 60. Surrounding the slot adapter 58, axially spaced therefrom, is a shroud 62 peripherally bolted or otherwise secured to a matching face 64 machined on the motor housing. On the end portion 63 of shroud 62 is provided a ball 65 loaded by a C-spring 61. Desirably the entire end portion 63 extends from panel face 12.

As has already been indicated motor 40 should be a constant speed type e.g., synchronous. A synchronous motor provides a fixed (low) speed (high torque) mechanical drive for take off at tap 34. A synchronous motor provides optimum suction and pressure characteristics. Indeed, such motors are conventionally employed for driving blowers of the nature illustrated in the drawing (the blower itself being of conventional construction). By way of specific example, a one-tenth horsepower synchronous motor will provide for an adequate mechanical drive, while drawing a vacuum of 15 inches mercury and providing air at 10 p.s.i., with somewhat less vacuum and pressure when both suction and pressure are desired simultaneously. The unit will pump about ½ a cubic foot of air per minute under a reasonable suction and mechanical drive load on the motor.

The mechanical drive attachment for use with mechanical drive tap 34 is a special double male quick connect flexible drive shaft assembly 70. The prong ends 72 of assembly 70 are identical; each formed with an upstanding key 74 and a base hub 75. The sheath 76 surrounding the usual coiled spring drive shaft terminates in a metal sleeve 78 having a groove 80 formed adjacent the end thereof. When prong 72 is engaged in slot adapter 58 with key 74 in the slot 60, the sleeve 78 penetrates end portion 63 of shroud 62 deeply enough for spring loaded ball 65 to lock, so to speak, in groove 80. The flexible drive assembly 70 is then in connected driven engagement with the motor shaft 56. The other end of the flexible drive assembly 70 may be connected through a female spindle 81 (having a like spring loaded ball 85 and slot adapter) to a tool, suitably a little grinding wheel 82.

It should be noted that the double male connection described above connects the flexible shaft through prongs 72 in driving relation to tool 82, in a manner which permits some necessary axial movement or play in the shaft and prong ends. However, the tool 82 is divorced from this play, receiving only torque. The tool is rotatably locked into the spindle 81, the spindle is attached to the stationary sheath 76 and sheath 76 is attached to the motor housing at machined face 64 by way of shroud 62. A slight axial movement of prongs 72 and key 74 along slot adapter 58 has no effect on tool 82, nor conversely does the pressure applied by the operator on tool 82 effect the flexible drive connections.

The reason for fuse knob 28 and foot pedal 24 should now become readily apparent. They are associated with the mechanical drive, the foot pedal to leave free both hands of the operator for manipulation of the work piece, the rotating tool, electrical tools etc., and the fuse knob 28 so that blowing a fuse (as for example by stopping the driven tool through an excessive torque load) need not hold up work longer than is required to insert a replacement fuse directly into the panel face 12.

An important characteristic of the present invention is the high order of flexibility possible with repair and maintenance power center 10. The facilities provided, namely electrical power, suction, pressure and mechanical drive can, of course, be employed separately as needed in the course of repairing electronic components. However, a principal advantage of center 10 resides in the possibilities for simultaneous employment of the facilities in any of several combinations. For example, a solder extractor connected to a power supply tap 14 can melt solder while a vacuum connection from vacuum tap 30 to the solder extractor removes the molten solder. Important to the concept of power center 10 as a unitary whole is the possibility for mechanically abrading away matter such as encapsulating resin and underlying that the metal of a defective connection, while air cooling the region being abraded (by an air line connection to pressure tap 32) and, at the same time, the dust so generated is removed (by a suction line connection to vacuum tap 30).

It should be appreciated that the above description of the invention has been made in terms of preferred exemplary construction and uses therefor, and that changes and other uses as will suggest themselves to the skilled of the art are contemplated within the scope of the hereto appended claims.

What is claimed is:

1. A repair and maintenance unit comprising a unitary source of vacuum, pressure and mechanical drive, said source further comprising an electric motor-blower combination with the inlet side of the blower serving to provide the vacuum, and the outlet side of the blower serving to provide the pressure and with the shaft of the motor serving to provide mechanical drive, said unit further comprising a housing having thereon a panel face, the unitary source of vacuum, pressure and mechanical drive being enclosed by the housing, with spaced apart quick connect taps on said panel face internally connected to the inlet side of the blower, to the outlet side of the blower and to the shaft of the motor providing thereby ready accessibility at the panel face for vacuum, pressure and mechanical drive.

2. The apparatus of claim 1 wherein a foot pedal switch is provided to control said unitary source.

3. The apparatus of claim 1 wherein at least one electrical power outlet is also provided on said panel face.

4. The apparatus of claim 1 wherein the mechanical drive structure associated with the shaft of said motor further comprises a slot adapter mounted on the end of said shaft, a locking shroud surrounding the slot adapter and shaft end, one end of said shroud being affixed to the end of the motor housing, said shroud further having adjacent the other end thereof, a detent member for locking a male ended flexible drive assembly into driven engagement with the slot adapter.

5. The apparatus of claim 4 wherein the locking detent is a spring biased ball adapted to rest in a groove formed adjacent the end of a sheath on a flexible assembly.

6. The apparatus of claim 1 wherein said electric motor is a synchronous motor.

7. The apparatus of claim 1 wherein a quick connect female driving connection adapted for use with a male ended flexible drive assembly is mounted on said motor; and wherein said driving connection protrudes from the panel face.

References Cited

UNITED STATES PATENTS

| | | | |
|---|---|---|---|
| 1,357,364 | 11/1920 | Van Bree | 64—4 X |
| 1,590,619 | 6/1926 | Ernst | 64—4 X |
| 1,810,336 | 6/1931 | Bennington | 51—273 |
| 2,097,655 | 11/1937 | De Marchi | 51—273 X |
| 2,107,580 | 2/1938 | Parks | 51—273 X |
| 2,602,180 | 7/1952 | Miller | 228—20 |
| 2,618,940 | 11/1952 | Wyzenbeek | 64—4 |
| 3,103,069 | 9/1963 | Gary | 51—273 X |
| 3,163,145 | 12/1964 | Duhaime | 228—20 |
| 3,213,537 | 10/1965 | Balamuth | 32—58 X |

FOREIGN PATENTS

| | | |
|---|---|---|
| 280,118 | 11/1927 | Great Britain. |

NILE C. BYERS, Jr., *Primary Examiner.*